United States Patent [19]
Kurihara et al.

[11] 3,801,726
[45] Apr. 2, 1974

[54] SNOW-RESISTANT CONDUCTOR

[75] Inventors: Masayuki Kurihara; Akira Takebayasi; Kazuo Goto; Norio Higuchi, all of Sappora; Ryuso Kimata, Yokohama; Jun Katoh, Tokyo; Toshikazu Minyu, Nikko, all of Japan

[73] Assignee: The Furukawa Electric Co. Ltd, Tokyo, Japan

[22] Filed: Feb. 7, 1972

[21] Appl. No.: 223,928

[30] Foreign Application Priority Data
Feb. 10, 1971  Japan................................. 46-6891
Feb. 17, 1971  Japan............................... 46-11784
Mar. 2, 1971   Japan............................... 46-10821

[52] U.S. Cl............. 174/40 R, 174/70 R, 174/130, 174/135, 174/DIG. 12
[51] Int. Cl............................................. H02g 7/16
[58] Field of Search......... 174/40 R, 40 TD, 41, 42, 174/68 R, 70 R, 72 A, 119 R, 127, 128, 129 R, 130, 131 R, 131 A, 131 B, 135, 136, DIG. 12

[56] References Cited
UNITED STATES PATENTS
1,515,293  11/1924  Whitehead........................ 174/127
1,626,777  5/1927   Austin................................ 174/127
2,609,653  9/1952   Peterson......................... 174/128 X
3,296,357  1/1967   Greber............................. 174/135 X
3,316,345  4/1967   Toms et al. .................. 174/40 R X
3,391,244  7/1968   Moll................................ 174/40 R
3,496,285  2/1970   Slethei ............................. 174/130
3,553,341  1/1971   Hureau .............................. 174/6
3,571,863  3/1971   Logan........................... 174/72 A X
3,641,251  2/1972   Liao............................. 174/127 X FOREIGN PATENTS OR APPLICATIONS
1,563,701  3/1969   France............................... 174/135
639,040    6/1950   Great Britain...................... 172/147
698,460    10/1953  Great Britain...................... 174/135
734,092    7/1955   Great Britain................... 174/40 TD
320,902    5/1957   Switzerland......................... 174/41

Primary Examiner—Laramie E. Askin
Attorney, Agent, or Firm—Toren & McGeady

[57] ABSTRACT

A snow-resistant conductor consists of protruding lines formed on the outer periphery of a conductor, the conductor is formed of a number of stranded round component wires and the protruding lines are formed in such a manner as to cross the component wires in the outermost layer of the conductor.

5 Claims, 12 Drawing Figures

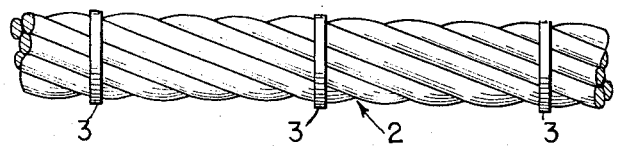
FIG. 1a
FIG. 1b
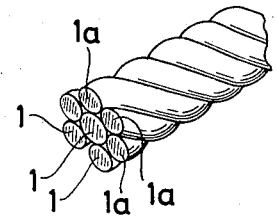
FIG. 2d  FIG. 2a  FIG. 2b  FIG. 2c
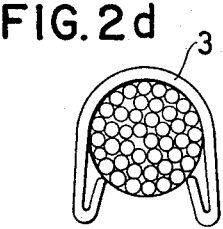 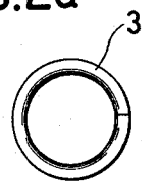 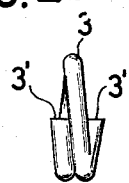 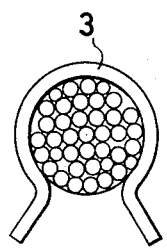
FIG. 3
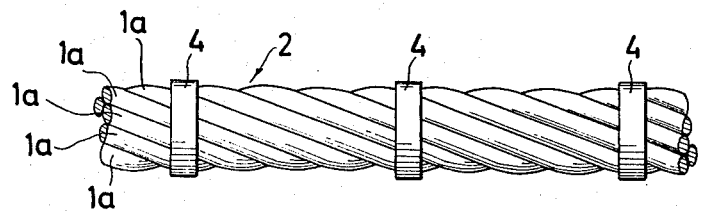
FIG. 4
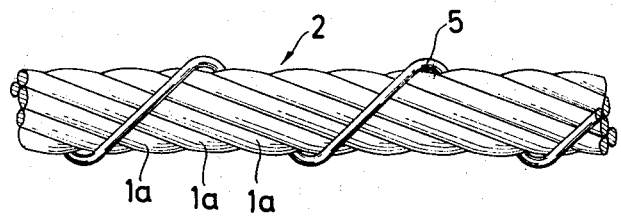

FIG.5
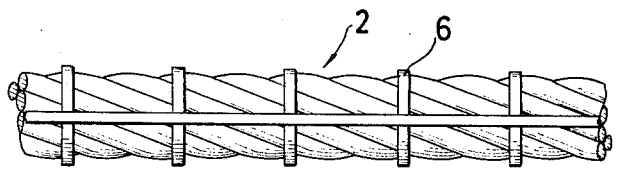
FIG.6
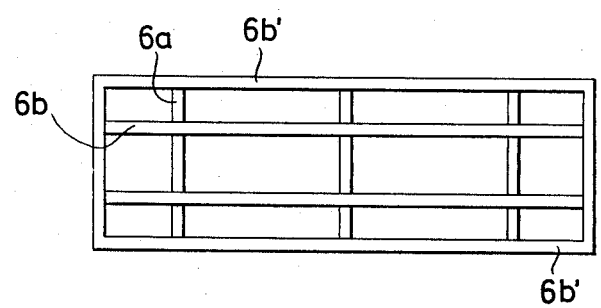
FIG.7
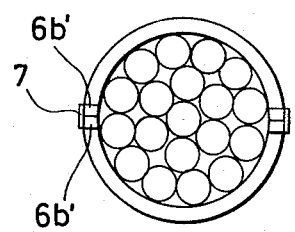
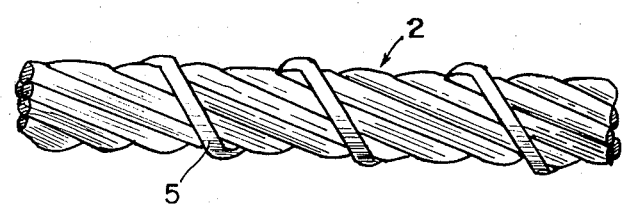
FIG.8

SNOW-RESISTANT CONDUCTOR

The present invention relates to a snow-resistant conductor and, more particularly, to a snow-resistant conductor consisting of a number of stranded round component wires used for power transmission and distribution lines and ring-shaped members forming protruding lines on the outermost layer of the conductor for preventing snow from forming a tubular layer on the outer periphery of the conductor.

Now, the word "conductor∞ shall hereinafter mean the conductor and earth conductor, such as aluminum conductor steel reinforced (ACSR), all aluminum conductor, copper and other metal conductors, used for transmission and distribution lines.

Recently the demand for power supply has remarkably increased. Therefore, power supply systems have been extensively expanded and in instances the transmission and distribution lines are installed in hilly terrain where heavy snowfall occurs. Ordinarily conductors passing over hilly terrain and exposed to heavy snowfall are apt to have a large amount of snow formed on their surfaces. When a large amount of snow gathers on a conductor, the increased load creates abnormal stress on the conductor, accessories and tower structures. As a result, such serious troubles as breakage of wire or damages to accessories may occur, or such serious accidents as tilting or falling of the tower may be caused. Therefore, the conductors should not have a large amount of snow adhering to them.

There have been no adequate means developed to prevent the gathering of a large amount of snow on conductors. It has been suggested that one or more insulated wires be stranded together with a number of component wires which constitute a conductor. This conductor melts the snow with the heat generated by current passed through the insulated wires only when snow is found lying on the conductor. However, such conductor has not been placed in practical use because of the following difficulties:
 a. Structure of the conductor is complicated as a number of component wires and one or more insulating wires must be stranded together.
 b. The conductor is difficult to make.
 c. Jointing of the conductor is difficult.
 d. It is very difficult to supply power to the insulated wires.
 e. Power supply equipment of a large scale is required for the insulated wires.
 f. A large amount of current is required to produce heat for melting the snow.
 g. Cost involved is very high.

Therefore, it has been strongly desired from the various fields concerned to develop a snow-resistant conductor which is free from the above difficulties and which can be produced simply and easily. The object of the present invention is to provide a snow-resistant conductor that satisfies said requirements and to prevent formation of a tubular layer of snow by forming protruding lines at the outer periphery of conductor in such manner as to run across the component wires of the outer layer of the conductor at a number of places.

The inventors of the present invention have made observations on the phenomena of snow forming, that is, how the snow adhering to a conductor forms a tubular layer of snow. It was revealed from these observations that the snow adhering to a conductor rotates along the lay of component wires of the outer layer of the conductor and gradually grows into a tubular snow formation. The tubular snow formation is most apt to develop when the temperature at the time of snowing is within the range of about 0° to 2°C. That is, snow falling when the temperature is below 0°C contains little water thus it is hard for it to adhere to the conductor, and even if it adheres to the conductor, it will be easily separated from the conductor by such external forces as wind, etc., since such snow is rather dry.

On the other hand, snow falling when the temperature is above 2°C will melt almost completely as it adheres to the conductor. Even if it adheres to the conductor, it will be easily separated off the conductor by such external forces as wind, etc., and under its own weight; because it is heavy since it contains a large amount of water. But, snow falling when the temperature is between 0° to 2°C contains such an amount of water as to make it liable to adhere to a conductor. The snow adhering to a conductor develops itself into a tubular formation through the following processes.

That is, since the conductor is composed of a number of stranded round component wires, it has spiral grooves at its outer periphery. At the same time as the conductor is supported with a sag, it has an inclination against the horizontal direction. Furthermore, water film is formed between the snow adhering to the conductor and the conductor itself as a portion of the snow is melted. Therefore, the snow in an adequate amount adhering to the upper surface of the conductor receives a rotating moment which tends to rotate the snow towards the lower portion as the snow loses its balance by such external forces as wind, etc., thus the snow rotates along the grooves at the outer periphery of the conductor, that is, along the component wires of the outer-most layer. The snow which is moved to the lower portion of the conductor does not come off. Instead it adheres to the conductor by surface tension of water film existing between the snow and the conductor. In this state, more snow adheres to the upper portion of the conductor. And this snow also rotates, as it reaches an adequate amount, along the component wires of the outer layer of the conductor. This process is repeated until the outer periphery of the conductor is covered with a tubular snow formation. The snow covering the outer periphery of the conductor further receives newly fallen snow which adheres to it; thus a thick tubular snow formation develops as such snow keeps rotating.

The inventors of the present invention reached the conclusion that in order to prevent tubular snow formation around the conductor, the snow adhering to the conductor should be prevented from rotating along the component wires of the outer-most layer of the conductor. That is, the rotation of the snow lying on the upper surface of the conductor is prevented and the snow is left there until it reaches such an amount that the effect of gravity on the lying snow becomes larger than the surface tension working on the interface of the water film existing between the conductor and the snow, the snow thus ultimately falling from the conductor under its own weight. This new method of preventing the formation of a tubular snow layer is distinctly different from such method as heating the conductor to melt the snow adhering to the conductor. The rotation of the snow adhering to the conductor can be prevented and tubular snow formation in an excessively large amount eliminated by providing at the outer periphery of the conductor such protruding lines as run across the component wires in the outermost layer of the conductor at many places.

The first object of the present invention is to provide a snow-resistant conductor which will not have any tubular snow formation.

The second object of the present invention is to provide a snow-resistant conductor having a simple construction.

The third object is to provide a snow-resistant conductor which is easy to maintain.

The fourth object is to provide a snow-resistant conductor which can be very easily made, using already installed conductors.

The fifth object is to provide a low-cost snow-resistant conductor.

The significant characteristic of the snow-resistant conductor of the present invention lies in forming at the outer periphery of the conductor such protruding lines or projections which run across component wires of the outermost layer of the conductor at many places. The height of the protruding lines or projections should be in the range of 0.5 to 5mm, preferably 1 to 3mm in order to attain good snow prevention.

Now, typical examples of the present invention shall be explained in detail referring to the drawings attached.

FIGS. 1a and 1b show a portion of the snow-resistant conductor according to the present invention;

FIGS. 2(a) and 2(b) show one embodiment of the ring used in the present invention;

FIGS. 2(c) and 2(d) show, respectively, a modified embodiment of the ring used in the present invention;

FIG. 3 to FIG. 6 show, respectively, modified embodiments of the snow-resistant conductor according to the present invention;

FIG. 7 is a cross-sectional view of FIG. 5; and

FIG. 8 is a view similar to FIG. 4 showing still another embodiment of the invention.

FIG. 1(a) and 1(b) show a portion of a snow-resistant conductor in which a number of rings, 3, 3 . . . ., are attached at the prescribed intervals around the outer periphery of a conductor 2 which is composed of a number of stranded round component wires, 1, 1,. . . . ., in such a manner as to run across the component wires of the outermost layer 1a, 1a, 1a. . . . . of said conductor, at many places. The rings 3 are attached preferably at the intervals of one pitch length of the outermost layer of the conductor or at the intervals of less than said one pitch length. As the material for the rings 3, rubber, plastic or metal wire with rubber covering, having springiness is used. The rings are formed in a round shape so that their original inside diameters are a bit smaller than the outer diameter of the conductor as shown in FIG.2(a) and FIG. 2(b). For placing the ring 3 around the conductor 3, both ends 3' 3' of the ring 3 are opened and are fitted on the conductor 2 as if the ring is pushed onto the conductor 2. Since this ring 3 fitted on the conductor 2 squeezes the conductor 2 with its springiness, it cannot freely move on the outer periphery of the conductor 2.

The ring may be modified as shown in FIG.2(c) and FIG.2(d), in which the ring is shown to have an opened and hooked lower portion.

The snow-resistant conductor of the present invention may have tapes 4 placed around its outer periphery at the prescribed intervals in such a manner as to cross the component wires, 1a, 1a. . . ., of the outermost layer of the conductor 2 at many places as shown in FIG.3. The width of these tapes 4 is preferably about one centimeter, and the thickness of the tape layer 4 placed around the conductor is about 0.5 to 5mm, preferably 1 –3mm. A tape having a thickness of about 0.5 to 5mm may be wound in a single layer or a tape having a smaller thickness may be wound overlapped until the total thickness reaches about 0.5 to 5mm. Any of metallic tape, plastic tape, or rubber tape may be used.

FIG. 4 shows another example of the snow-resistant conductor of the present invention. According to this drawing a line-shaped material 5 is, in a spiral manner, placed around the outer periphery of the conductor 2 in such direction as crosses the component wires, 1a, 1a. . . ., of the outermost layer of said conductor at many places, that is, in a direction reverse to the lay of the component wires 1a, 1a, 1a. . . ., of outermost layer. For said line-shaped material, such rubber or plastic as is resistant to snow is desirable. Said line-shaped material 5 is wound around the conductor in the course of its production, or it is applied to the already installed conductor by having a lashing machine run along the conductor. Two pieces of the line-shaped material 5 may be placed around the conductor in a direction reverse to the lay of the outermost layer of the conductor or it may be placed around the conductor in the same direction as that of the lay of the outermost layer, but with a different pitch from the lay pitch of the outermost layer, note FIG. 8.

FIG. 5 shows still another example of the snow-resistant conductor of the present invention. According to this drawing, a lattice 6 is attached in a longitudinal direction to the outer periphery of the conductor 2 in close contact with the conductor 2. The lattice 6 is composed of warp straps 6a and filling straps 6b as shown in FIG. 6, and is attached in a longitudinal direction to the outer periphery of the conductor 2 in such manner that the warp straps 6a and filling straps 6b cross the component wires of the outermost layer of the conductor 2. This lattice 6 is attached to the conductor 2 in close contact therewith by putting together two filling straps 6b', 6b' at outermost edges of the lattice in a butted arrangement and then bonding both straps together with adhesive tape 7 as shown in FIG. 7. As the material for this lattice 6, plastic or rubber which is flexible and to which snow is hard to adhere is desirable. The thickness of the lattice is preferably 0.5 to 5mm. The lattice may be placed around the conductor in a spiral manner.

Next, explanations shall be made on the case in which snow adheres to the snow-resistant conductor according to the present invention, so composed as mentioned above.

The snow adhering to the conductor tends to rotate along the component wires of the outermost layer of the conductor. However, protruding lines exist around the outer periphery of the conductor in such manner as to cross the component wires of the outermost layer of said conductor at many places. Therefore the snow adhering to the conductor is prevented from rotating along the component wires of the outermost layer by the protruding lines. The snow whose rotation is prevented by the protruding lines gets more snow adhering thereto. As snow continues to fall, a large amount of snow adheres to the upper surface of the conductor. The center of gravity of the snow adhering to the conductor moves upward from the upper surface of the conductor as snow continues to fall.

Therefore, when such external forces as wind, etc., works on the snow adhering to the conductor, a big rotating moment works on said snow, sending it off balance. As a result the snow adhering to the upper portion of the conductor moves along the component wires of the outermost layer of the conductor, assisted by the inclination the conductor has. The moving mass of snow is so heavy that a gravity force, larger than the surface tension at the interface of the water film existing between the conductor and the snow, works on it, thus causing a large portion of the snow to readily fall away from the conductor. As has been explained, the snow-resistant conductor of the present invention makes a large amount of snow that has fallen on it, remain on its upper surface by preventing the rotation of snow with the protruding lines, thereby making gravity work on the snow, which force is greater than the surface tension working on the interface of the outer film existing between the conductor and the snow, so that the snow is separated from the conductor.

As explained above, the snow-resistant conductor of the present invention will not have a tubular snow formation. Furthermore, this snow-resistant conductor can be obtained by forming protruding lines at the outer periphery of the conductor in such manner as to cross the component wires of the outer layer of the conductor at many places; therefore said protruding lines can be quite easily applied to the conductor during its manufacture or to any already installed conductor. This snow-resistant conductor does not need any troublesome maintenance. Moreover, the snow-resistant conductor is very simple in construction and can be produced at low cost.

What is claimed:

1. A snow-resistant conductor consisting of a core of twisted stranded round conductor component wires with the wires on the periphery of the core extending in a helical path about the axis of the core, and ring-shaped members extending perpendicularly of the axis of the core and positioned about and completely enclosing and in contact with its periphery, said ring-shaped members extending radially outwardly from the periphery of said core and forming protruding lines on the periphery of said core so that the protruding lines cross the helically wound component wires on the periphery for preventing the formation of a tubular layer of snow on the periphery of said conductor, said ring-shaped members grip said core and are secured against axial displacement, said ring-shaped members having a round surface in contact with the periphery of said core and the radial dimension of said ring-shaped members being in the range of 0.5 to 5.0 mm and being considerably smaller than the diameter of said core, and said ring-shaped members are spaced apart in the axial direction of said core at intervals not greater than one pitch length of said component wires on the periphery of said core.

2. A snow-resistant conductor, as set forth in claim 1, wherein said ring-shaped members are formed of a springy material and prior to being placed on said core have an inside diameter which is less than the outside diameter of said core.

3. A snow-resistant conductor, as set forth in claim 1, wherein said ring-shaped members are formed of a tape wound on said core to a thickness in the range of 0.5 to 5.0 mm so that said ring-shaped member grips or clamps said core, and said tape having a width of about 1 cm measured in the axial direction of said core.

4. A snow-resistant conductor, as set forth in claim 1, wherein said ring-shaped members are formed of a rubber-like plastic having an inside diameter slightly smaller than the outside diameter of said core so that said ring-shaped member grips said core tightly.

5. A snow-resistant conductor comprising a core of twisted stranded round component wires with the wires on the periphery of the core extending in a helical path about the axis of the core, and a lattice member wrapped about and encircling the periphery of said core, said lattice member comprising a plurality of warp straps extending transversely of the axis of the core and a plurality of filling straps extending in the axial direction of the core, said warp straps and filling straps being interconnected, and means securing a pair of adjacent filling straps together for securing at least one said lattice into a ring-shaped member encircling said core so that said warp straps and filling straps extend across the helically wound component wires on the periphery of the core for preventing the formation of a tubular snow layer on the periphery of the conductor.

* * * * *

UNITED STATES PATENT OFFICE
CERTIFICATE OF CORRECTION

Patent No. 3,801,726  Dated April 2, 1974

Inventor(s) Masayuki Kurihara et al

It is certified that error appears in the above-identified patent and that said Letters Patent are hereby corrected as shown below:

In the heading of the patent:

The filing date of Japanese priority application 46-11784 should read

--February 27, 1971--.

Signed and sealed this 10th day of September 1974.

(SEAL)
Attest:

McCOY M. GIBSON, JR.
Attesting Officer

C. MARSHALL DANN
Commissioner of Patents